Feb. 23, 1943.  J. F. LUHRS  2,311,848
MEASURING AND CONTROLLING APPARATUS
Filed July 6, 1939   4 Sheets-Sheet 2

INVENTOR
JOHN F. LUHRS
BY
ATTORNEY

Patented Feb. 23, 1943

2,311,848

UNITED STATES PATENT OFFICE 2,311,848

MEASURING AND CONTROLLING APPARATUS

John F. Luhrs, Cleveland Heights, Ohio

Application July 6, 1939, Serial No. 283,024

11 Claims. (Cl. 122—448)

This invention relates to the art of measuring a variable quantity, such as the density of a liquid-vapor mixture.

I have chosen to illustrate and describe as a preferred embodiment of my invention its adaptation to the measuring and controlling of the density and other characteristics of a flowing heated fluid stream, such as the flow of hydrocarbon oil through a cracking still.

While a partially satisfactory control of the cracking operation may be had from a knowledge of the temperature, pressure and rate of flow of the fluid stream being treated, yet a knowledge of the density of the flowing stream at different points in its path is of a considerably greater value to the operator, but was not available prior to the discovery by Robert L. Rude, as disclosed in his copending application Serial No. 152,860 filed July 9, 1937, now Patent No. 2,217,634.

In the treatment of water below the critical pressure, as in a vapor generator, a knowledge of temperature, pressure and rate of flow may be sufficient for proper control, inasmuch as definite tables have been established for interrelation between temperature and pressure and from which tables the density of the liquid or vapor may be determined. However, there are no available tables for mixtures of liquid and vapor.

In the processing of a fluid, such as a petroleum hydrocarbon, a change in density of the fluid may occur through at least three causes.

1. The generation or formation of vapor of the liquid, whether or not separation from the liquid occurs.
2. Liberation of dissolved or entrained gases.
3. Molecular rearrangement as by cracking or polymerization.

The result is that no temperature-pressure-density tables may be established for any liquid, vapor, or liquid-vapor condition of such a fluid, and it is only through actual measurement of the density of a mixture of the liquid and vapor that the operator may have any reliable knowledge as to the physical condition of the fluid stream at various points in its treatment.

It will be readily apparent to those skilled in the art that the continuous determination of the density of such a flowing stream is of tremendous importance and value to an operator in controlling the heating, mean density, time of detention and/or treatment in a given portion of the circuit, etc. A continuous knowledge of the density of such a heated flowing stream is particularly advantageous where wide changes in density occur due to formation, generation, and/or liberation of gases, with a resulting formation of liquid-vapor mixtures, velocity changes, and varying time of detention in different portions of the fluid path. In fact, for a fixed or given volume of path, a determination of mean density in that portion provides the only possibility of accurately determining the time that the fluid in that portion of the path is subjected to heating or treatment. By my invention I provide the requisite system and apparatus wherein such information is made available continuously to an operator and furthermore comprises the guiding means for automatic control of the process or treatment.

While illustrating and describing my invention as preferably adapted to the cracking of petroleum hydrocarbon, it is to be understood that it may be equally adaptable to the vaporization or treatment of other liquids and in other processes.

In the drawings:

Fig. 4 is a diagrammatic arrangement of the invention in connection with a heated fluid stream.

Figure 1:
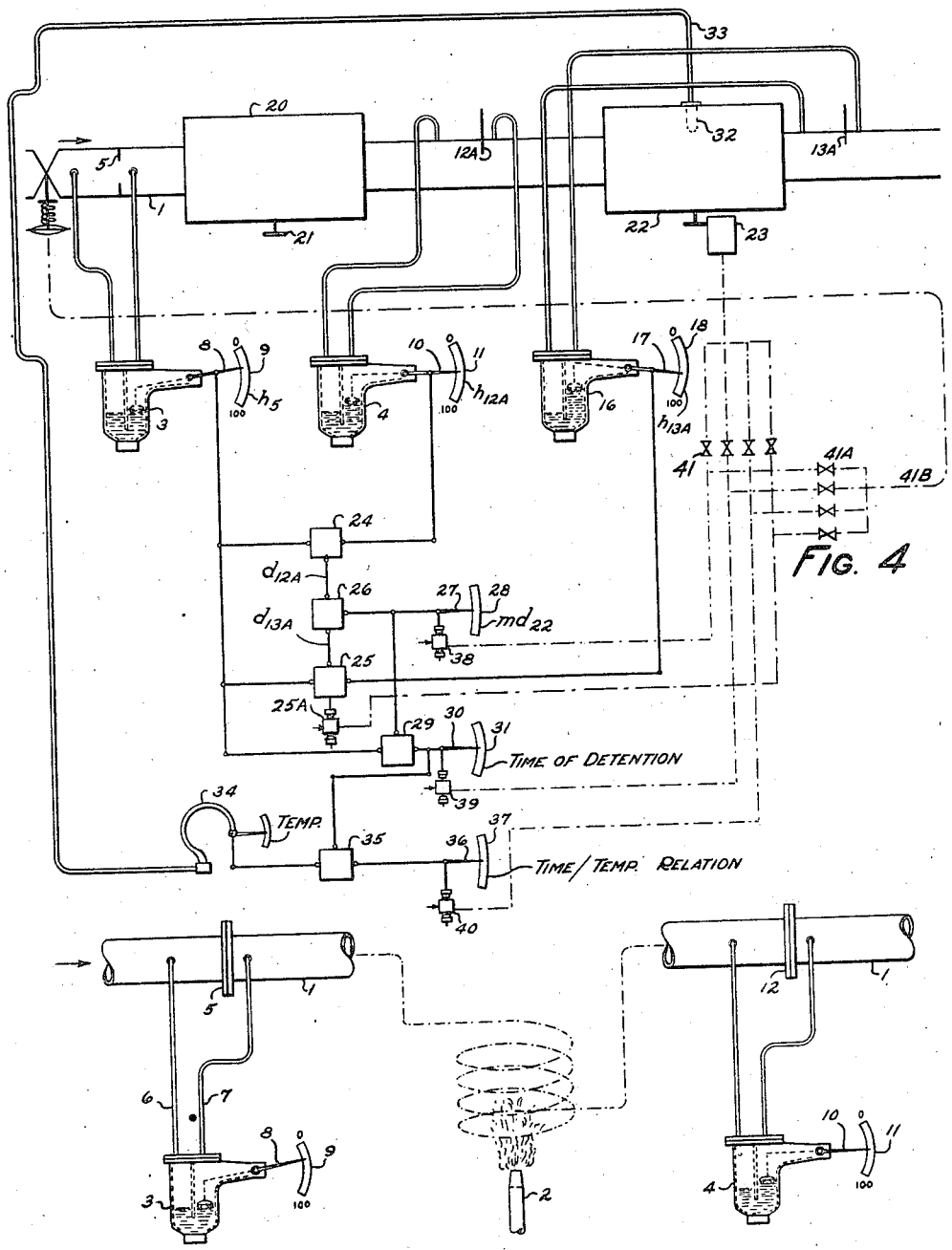
Fig. 1 is a diagrammatic representation of density measuring apparatus for a heated fluid stream.

Referring now in particular to Fig. 1, I indicate a conduit 1 which may be considered as comprising the once through fluid path of an oil still wherein a portion of the path is heated as by a burner 2. The rate of flow of the charge or relatively untreated hydrocarbon is continuously measured by the rate of flow meter, or differential recorder 3, while a differential recorder 4 is located with reference to the conduit 1 beyond the heating means or after the flowing fluid has been subjected to heating or other processing.

The float actuated meter 3 is sensitive to the differential pressure across an obstruction, such as an orifice, flow nozzle, Venturi tube, or the like, positioned in the conduit for effecting a temporary increase in the velocity of the flowing fluid. Such an orifice may be inserted in the conduit between flanges as at 5. The meter 3 is connected by pipes 6, 7 to opposite sides of the orifice 5 and comprises a liquid sealed U-tube, in one leg of which is a float operatively connected to position an indicator 8 relative to an index 9. In similar manner the indicator 10 of the meter 4 is positioned relative to an index 11.

The relation between volume flow rate and differential pressure (head) is:

$$Q = CM\sqrt{2gh} \qquad (1)$$

where

Q = cu. ft. per sec.
C = coefficient of discharge
M = meter constant (depends on pipe diameter and diameter of orifice hole)
g = acceleration of gravity = 32.17 ft. per sec. per sec.
h = differential head in ft. of the flowing fluid.

The coefficient of discharge remains substantially constant for any one ratio of orifice diameter to pipe diameter, regardless of the density or specific volume of the fluid being measured. With C, M, and $\sqrt{2g}$ all remaining constant, then Q varies as $\sqrt{h}$. Thus it will be seen that the float rise of the meters 3, 4 is independent of variation in density or specific volume of the fluid at the two points of measurement and that the reading on the indexes 9, 11 of differential head is directly indicative of volume flow. If the conduit size and orifice hole size are the same at both meter locations, then the relation of meter readings is indicative of the relation of densities and specific volumes.

This may readily be seen, for if it were desired to measure the flowing fluid in units of weight, Formula 1 becomes:

$$W = CM\sqrt{2ghd} \qquad (2)$$

where
W = rate of flow in pounds per sec.
d = density in pounds per cu. ft. of flowing fluid.
h = differential head in inches of a standard liquid such as water.
M = meter constant now including a correction to bring h of Equation 1 into terms of h of Equation 2.

Assuming the same weight rate of flow passing successively through two similar spaced orifices 5, 12 and with a change in density as caused by the heating means 2, then the density at the second orifice 12 may be determined as follows:

$$W_{12} = W_5$$

$$\sqrt{2gh_{12}d_{12}} = \sqrt{2gh_5 d_5}$$

$$\sqrt{h_{12}d_{12}} = \sqrt{h_5 d_5}$$

$$d_{12} = d_5 \times \frac{h_5}{h_{12}} \qquad (3)$$

Thus it will be observed that, knowing the density of the fluid passing the orifice 5 we may readily determine the density of the fluid passing the orifice 12, from the relation of differential pressures indicated by the meters 3, 4.

Figure 2:
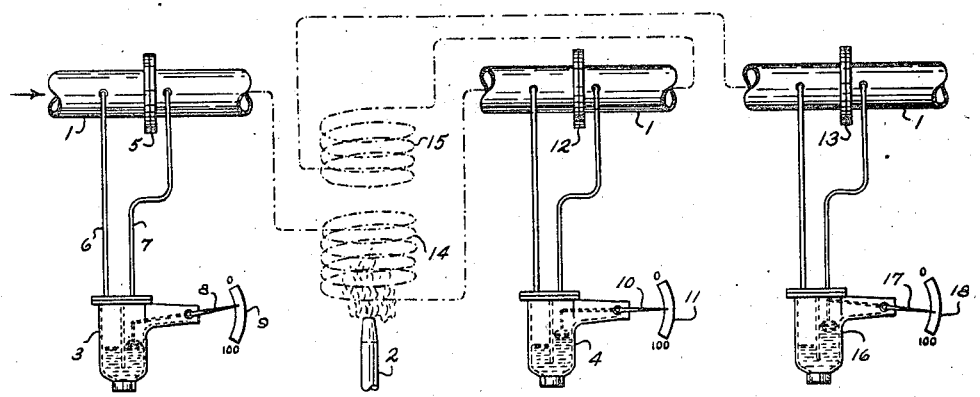
Fig. 2 is similar to Fig. 1, but includes the determination of mean density.

Referring now to Fig. 2, wherein like parts bear the same reference numerals as in Fig. 1, I indicate that after the fluid has passed through the orifice 12 it is returned to a further heating section of the still, from which it passes through a third differential pressure producing orifice 13. The heating coil 14 will be hereinafter referred to as a first heating section, while the coil 15 will be referred to as a second heating section. In the preferred arrangement and operation of the still the section 15 is the conversion or cracking section, and the one in which it is primarily desirable to continuously determine the mean density of the fluid, as well as its time of detention or treatment in this section. For that reason I now desirably determine the mean density of the fluid in the section 15 and accomplish this through an interrelation of the differential pressures produced by the same weight flow passing successively through the orifices 5, 12, 13.

The same total weight of fluid must pass through the three orifices in succession so long as there is no addition to or diversion from the path intermediate the orifices. It is equally apparent that in the heating of a petroleum hydrocarbon, as by the coil 14 between the orifices 5 and 12, there will be a change in density of the fluid between the two orifices, and furthermore that an additional heating of the fluid, as by the coil 15, will further vary the density of the fluid as at the orifice 13 relative to the orifice 12.

Assume now that the conduit 1 is of a uniform size throughout and that the orifices 5, 12 and 13 are of uniform diameter and coefficient or characteristic. Through the agency of the meter 16 the differential pressure existing across the orifice 13 is continuously indicated upon an index 18 by an indicator 17. The mean density of the conversion section 15 is then obtained by averaging the density of the fluid at the orifices 12, 13. As for example:

$$md_{15} = \frac{d_{12} + d_{13}}{2} \qquad (4)$$

The density of fluid at the orifice 13 may be obtained in the same manner, relative to the density of the fluid at the orifice 5, as was previously determined for the density of the fluid at the orifice 12. Simplifying this into a single operation, we have:

$$md_{15} = \frac{d_5 \times \frac{h_5}{h_{12}} + d_5 \times \frac{h_5}{h_{13}}}{2}$$

$$= d_5 \frac{\frac{h_5}{h_{12}} + \frac{h_5}{h_{13}}}{2} \qquad (5)$$

Thus the mean density of the fluid in the conversion section 15 (knowing the density or specific gravity of the fluid entering the system) may be directly computed from the readings of the indexes 9, 11, 18. This is of course on the basis that the orifices 5, 12, 13 are the same, and that the capacity of the float meters 3, 4, 16 is the same.

If the meter 3 is on a weight rate basis and indicates in terms of W = #/hr. then $$d_{13} = K \frac{W^2}{h_{13}}$$

where K = a constant
and $$md_{15} = \frac{K\frac{W^2}{h_{12}} + K\frac{W^2}{h_{13}}}{2}$$

In this event it is not necessary to determine the density or specific gravity of the fluid entering the system, as at the orifice 5, unless it departs from that to which the flow meter is calibrated, in which case the meter reading must necessarily be corrected to design condition.

Figure 3:
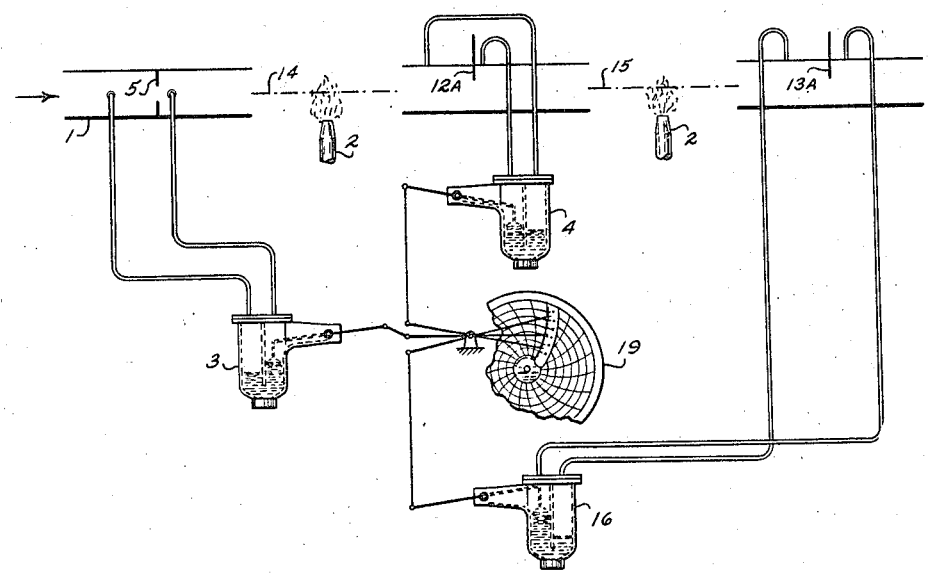
Fig. 3 is similar to Fig. 2 with correlated indications.

At Fig. 3 I illustrate an arrangement very similar to that of Fig. 2, but wherein the readings of differential pressure are continuously recorded in interrelation upon a single recording chart 19 for ready comparison and record.

Now as the specific volume increases progressively from locations 5 to 12 to 13 the differential pressure across these orifices increases in like manner, and in the operation of such a cracking still it may be that the differential pressure across an orifice 13 will be several times that across the orifice 5 if the orifice sizes are equal. I have, therefore, indicated at 12A, 13A of Fig. 3 that these orifices may be of an adjustable type whereby the ratio of orifice hole to pipe area may be readily varied externally of the conduit through suitable hand wheel or other means. The actual orifice design in terms of pounds per hour is:

$$W = 360 c f D^2 \sqrt{\frac{\max h}{\text{sp. vol.}}} \quad (6)$$

where $W = \#/\text{hr}.$
$D =$ diameter of equivalent circular orifice hole in inches
$c =$ coefficient of discharge
$f =$ factor of approach
sp. vol. $=$ cu. ft./lb.

Now considering that orifice 12A is so adjusted that its $cfD^2$ is different from that of orifice 5, we may then determine the density at 12A as follows:

$$d_{12A} = CR^2$$

where $$C = d_5 \left( \frac{cfD_5^2}{cfD_{12A}^2} \right)^2$$

$$R = \frac{\sqrt{h_5}}{\sqrt{h_{12A}}}$$

$$d_{12A} = d_5 \left( \frac{cfD_5^2}{cfD_{12A}^2} \right)^2 \times \left( \frac{\sqrt{h_5}}{\sqrt{h_{12A}}} \right)^2 \quad (7)$$

In similar manner we may determine the density at the orifice 13A regardless of the orifice area, so long as we take into account the $cfD^2$ of the orifice in the above manner. It will thus be seen that if the specific volume of the flowing fluid increases so rapidly that the differential heads at successive orifice locations (for the same design orifice) become many times the value of the differential head at the initial orifice, it would be impractical to attempt to indicate or record such differential heads relative to a single index or record chart without one or more of the indications or records going beyond the capacity of the index or chart. There are two ready means of overcoming this practical difficulty, the first being an adjustment of the successive orifices, such as 12A, 13A to have new values of $cfD^2$ such that the indicator or recording pen will be kept on the chart; and the second through varying the basic capacity of the meter 4 or 16 relative to the meter 3. This latter method comprising so arranging the meter 4, for example, that it requires 50% greater differential pressure to move the related pointer over full index range than in the case of meter 3. This may readily be accomplished by properly proportioning the two legs of the mercury U-tube, on one of which the float is carried. Of course it will be necessary to take such change in capacity into account when utilizing the differential head readings in determining density or mean density.

For example, the reading of the pointer relative to the index should be on a percentage basis of whatever maximum head the meter is designed for. Then the total head corresponding to the indicator reading will be available or the proper correction may be applied. Assume that the meter U-tube 3 is so shaped that it requires 120″ water differential applied thereto to move the indicator 8 from 0 to 100% travel over the index 9, and that for meters 4 and 16 it requires 250″ water differential to cause the indicator 10 to move from 0 to 100% over the index 11, and 17 relative to 18. Then:

$F_3 = \%$ float travel of meter 3

$F_4 = \%$ float travel of meter 4

$$\frac{h_5}{h_{12}} = .48 \frac{F_3}{F_4}$$

substituting in (7)

$$d_{12A} = d_5 \left( \frac{cfD_5^2}{cfD_{12A}^2} \right)^2 .48 \frac{F_3}{F_4} \quad (8)$$

and $$md_{15} = \frac{.48 d_5}{2} \left[ \left( \frac{cfD_5^2}{cfD_{12A}^2} \right)^2 \frac{F_3}{F_4} + \left( \frac{cfD_5^2}{cfD_{13A}^2} \right)^2 \frac{F_3}{F_{16}} \right] \quad (9)$$

In Fig. 4 I show in diagrammatic fashion an arrangement similar to that of Figs. 2 and 3, but adapted to give further indications valuable as a guide to operation of the system and with means for automatic control of the process from certain of such indications.

The fluid after passing the orifice 5 enters a heating section 20 having a hand actuated regulating means 21. The fluid then passes the orifice 12A and enters a heating section 22 wherein the heating is regulated by a control device 23. I have shown herein in diagrammatic fashion that the values $h_5$ and $h_{12A}$ are applied to a mechanism 24, and the values $h_5$ and $h_{13A}$ are applied to a mechanism 25. The resultant value of density of the fluid at the orifice 12A from the mechanism 24, and the resultant value of density of the fluid at the orifice 13A from the mechanism 25, are applied to a mechanism 26 which indicates by the pointer 27 upon the index 28 the value of mean density of the fluid passing through the heater 22. Mean density and $h_5$ are then applied to a mechanism 29 from which is indicated a resultant in terms of time by a pointer 30 upon an index 31.

In the operation of such a cracking still it is of considerable importance to determine the time-temperature relation of the conversion section. For example, the time that any particle remains in this section and the temperature to which it is subjected. To determine such temperature I indicate in Fig. 4 at 32 the bulb of a gas-filled thermometer system of which 33 indicates the connecting capillary and 34 a Bourdon tube whose free end is positioned responsive to the temperature at the bulb location.

The temperature sensitive means 34 and the time indicating means 30 then act through a mechanism 35 to move an indicator 36 relative to an index 37 to indicate directly the time-temperature relation of the fluid through the heating section 22.

I have indicated that the control mechanism 23 may be positioned in accordance with density, mean-density, time, or time-temperature relation. To accomplish this I provide air pilot valves 38, 39, 40, 25A positioned respectively through the agency of logarithmic means by the indicators 27, 30, 36, and logarithmic density determining means 25 for controlling a pressure fluid and selectively made effective upon the control mechanism 23 by means of the valves 41.

The air loading pressure from the pilot valves 38, 39, 40 may be selectively made effective upon a fluid flow control valve in the conduit 1 through the agency of hand valves 41A and the pressure line 41B.

The air pilot valves 38, 39, 40 are of known type wherein axial movement of a pilot stem relative to fixed ports controls the pressure of a control fluid such as air at the outlet of the assembly. Such pilots are more fully described and claimed in the patent to Clarence Johnson, No. 2,054,464 granted September 15, 1936.

Figure 5:
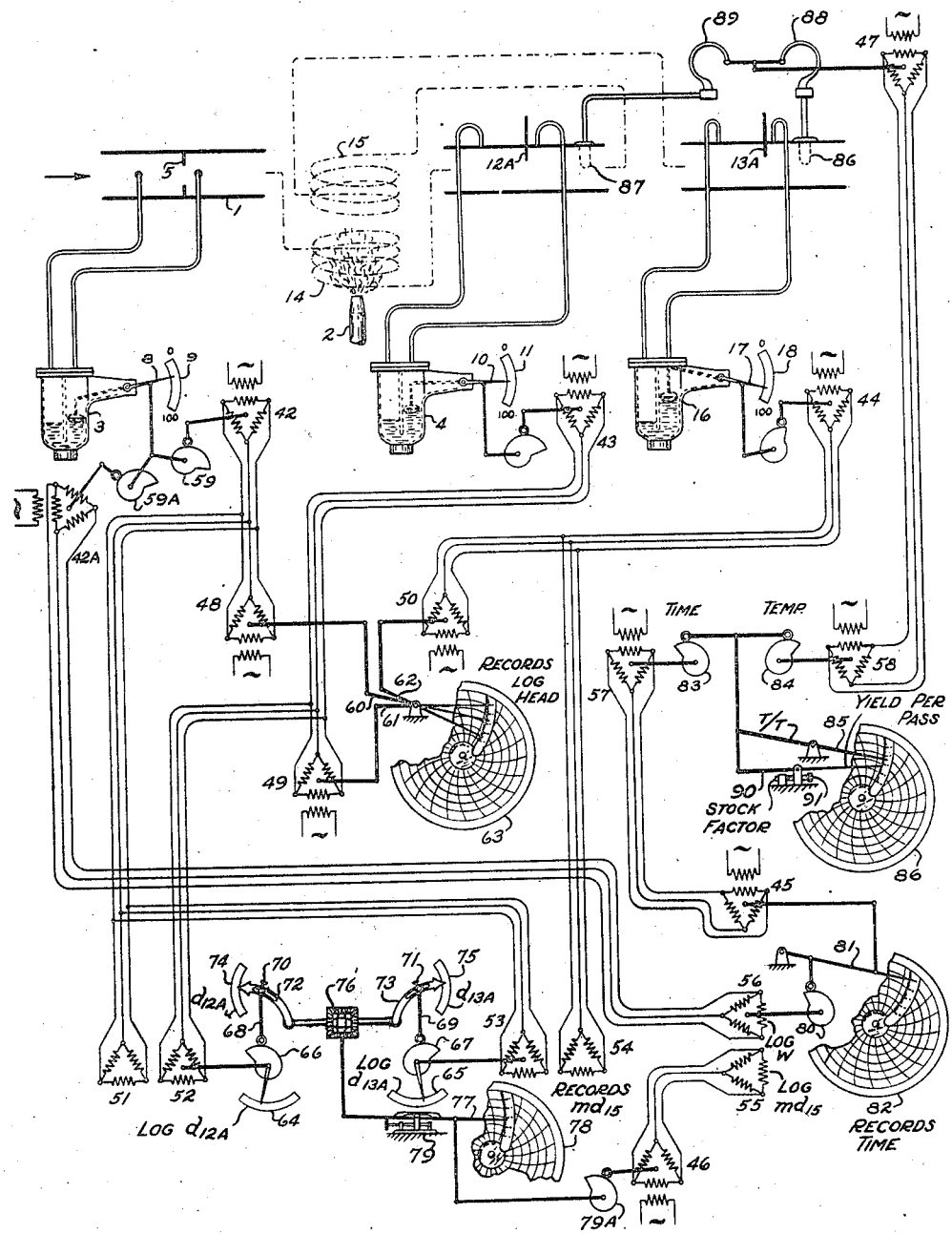
Fig. 5 is similar to Fig. 4 but, while diagrammatic, is in greater detail than Fig. 4.

In Fig. 5 I illustrate the actual mechanism which I preferably employ to accomplish the results which I have just described as diagrammatically illustrated in Fig. 4. For instance it will be observed that according to Equation 5 it is necessary in determining the mean density of the conversion section to obtain the ratio of the differential heads at orifices 5 and 12A. Then to obtain the ratio of the differential heads at orifices 5 and 13A. To then average these ratios. My method is based on the use of logarithms, a process well known in mathematics, whereby it is possible to obtain a quotient by subtraction or a product by addition. In connection with logarithmically designed cams I employ self-synchronous motors which lend themselves readily to addition or subtraction through differential windings, as well as having the feature of ready grouping at remote locations.

I indicate such self-synchronous generators for transmission of position at 42, 42A, 43, 44, 45, 46 and 47, while the self-synchronous receiving motors are indicated at 48, 49, 50, 51—52, 53—54, 55—56, 57 and 58. The transmitting generator in each case is operated at a suitable angular rotation through the angular positioning of the rotor or single phase field winding. The stator or armature is in each case provided with a 3-phase winding. The field windings of each transmitting generator are energized from a suitable source of alternating current supply.

The operation of systems of this general character for the transmission of angular movement is well known in the art. Voltages are induced in the 3-phase stator windings of the transmitter or receiver by the single phase field winding on the associated rotor. When the rotor of one of the transmitters is moved from a predetermined position with respect to its stator, a change is effected in induced voltage in the armature winding and the rotor of the receiving motor assumes a position of equilibrium relative to the transmitting generator, wherein the induced voltages in the 3-phase windings are equal and opposite, and consequently no current is set up in the armature winding. If the rotor of one of the generators is turned and held in a new position the voltage is no longer counterbalanced, whereby equalizing currents are caused to flow in the armature windings which exert a torque on the rotor of the receiving motor, causing it to take up a position corresponding to the position of the transmitted generator.

The receiving motors 48, 49, 50 are individually positioned in synchronism with the transmitting generators 42, 43, 44. Between the indicator arm 9 and the transmitting generator 42 I interpose a cam 59 having a rise proportional to the logarithm of its angular motion to the end that the receiving motor 48 and the recording indicator 60 positioned thereby assume a position corresponding to log $h_5$. Similarly the indicator arm 61 is positioned by the receiving motor 49 in accordance with the value of log $h_{12A}$, while the indicator 62 is positioned in accordance with the value of log $h_{13A}$.

Actually the design is such that the transmitting generator 42 (positioned in accordance with log $F_3$) attains maximum desired rotation with from 10–100% full float travel. No motion of the generator 42 occurs when the float of the meter 3 moves over 0–10% of its travel range. This because it is impossible to have a logarithmic cam start at zero, as the number 0 has no logarithm. Also because the logarithmic characteristics are such that I would have as much cam rise for from 1% to 10% of float rise as for from 10% to 100%. Thus I may make the cam 59, and the similar cams of the meters 4 and 16, of practical size and proportion by sacrificing only the first 10% of the float travel of the meters and with the expectation that the operation will not normally be below 10% of full float travel.

In addition to indicating and recording in inter-relation upon the record chart 63 the values of the log of the differential pressures at the three orifices, the position of the transmitting generators 42, 43, 44 is utilized through the agency of differential self-synchronous devices to algebraically add the value of the log $h$ for the different orifices and thus accomplish the ratio operation. Angular movement imparted mechanically to the rotors of the transmitting generators 42, 43 will result in an angular positioning of the rotor of the receiving motor 51—52. Similar action occurs between the transmitting generators 42, 44 and the receiving motor 53—54; and between the transmitting generators 42A, 46 and the receiving motor 55—56.

The receiving motors 51—52, 53—54, and 55—56 have 3-phase rotor windings and 3-phase stator windings and are commonly known as differential self-synchronous motors, for in each case they are responsive to two of the transmitting generators and assume a rotor position corresponding in differential effect from the two related transmitters. For example, the receiving motor 51—52 has its rotor positioned responsive to a differential between the position of the rotor 42 and that of the rotor 43, or according to log $h_5$—log $h_{12A}$, thus performing the mathematical operation:

$$\log \frac{h_5}{h_{12A}} = \log h_5 - \log h_{12A}$$

Correspondingly the receiving motor 53—54 has its rotor positioned responsive to a differential between the position of the rotor 42 and that of the rotor 44, thus performing the mathematical operation:

$$\log \frac{h_5}{h_{13A}} = \log h_5 - \log h_{13A}$$

From Formula 5 the mean density of the fluid in the conversion section is the density of the fluid at orifice 5 multiplied by the average of the ratio of heads for the different orifice locations 12A and 13A. In designing the apparatus I incorporate an average expected value of specific gravity or density of the fluid at the orifice 5 in the transmitted motion of the rotor of 51—52 and of the rotor of 53—54. Thus, if the expected density exists at the orifice 5, the indicator moved by the rotor of 51—52 will indicate relative to the index 64 the instantaneous value of log $d_{12A}$ while on the index 65 may be read the instantaneous value of log $d_{13A}$.

The rotor of 51—52 angularly moves a cam 66 having a rise proportional to the antilog of its angular motion; likewise the rotor of 53—54 angularly moves an antilog cam 67. Thus the vertical movement of a roller at the lower end of a link 68, riding on the cam 66, is proportional to $d_{12A}$ and that of 69 to $d_{13A}$.

To obtain the mean density through the conversion section 15 it becomes necessary to solve Formula 4 and this I accomplish through a differential mechanism 76 adapted to position an indicator 77 relative to an index and recording shaft 78 to continuously record thereon the value of $md_{15}$.

It is to be understood that if the basic capacity of meters 3, 4, 16 vary one from the other, then as previously brought out, this may be taken care of as in (8). The linkage through which the arm 10 positions 43 and the linkage through which the arm 17 positions 44, may incorporate the necessary correction values. Or it might be taken into account as at (9) at the outlet side of antilog cams 66, 67. Furthermore, I have illustrated and described the orifices 12A and 13A as being adjustable as to $cfD^2$ value and (9) such may be taken into account at the same time.

Referring to Fig. 5, I have provided at 70—72 means for manually adjusting the effect of angular positioning of cam 66 upon one half of differential 76. Thus cam 66 which is angularly moved proportional to $$\log \frac{F_3}{F_4} \text{ or } \log \frac{h_5}{h_{12A}}$$

will position the arm 72 relative to the index 74 according to $$d_5 \left( \frac{cfD_5^2}{cfD_{12A}^2} \right)^2 \frac{h_5}{h_{12}}$$

or $d_{12A}$. Likewise on 75 may be indicated $d_{12A}$. The differential 76 then positions the arm 77 according to $$\frac{d_{12A} + d_{13A}}{2}$$

or $md_{15}$.

At 79 I indicate a manual adjustment of the motion of arm 77 to take into account deviations in value of $d_5$ of (9) from design conditions, as might be attributed to changes in specific gravity, temperature, etc.

The arm 77 is adapted to position a logarithmic cam 79A for moving a transmitter 46 proportional to log $md_{15}$. The meter 3 positions a cam 59A for moving a transmitter 42A proportional to log $\sqrt{h_5}$, which so long as $d_5$ remains constant equals log $W$ where $W$ is rate of flow in lbs. The differential motor 55—56 is then under the influence of the transmitters 42A, 46 representative of log $W$ and log $md_{15}$ and the resulting angular motion of cam 80 is:

$$\log T = \log md_{15} - \log W$$

Cam 80 is of antilog design and the arm 81 is moved relative to record 82 to indicate the time of detention of any particle of fluid in the heating section 15, from:

$$T = \frac{Vmd_{15}}{W}$$

where $T$=time any particle is in section 15.
$V$=volume between 12A and 13A (cu. ft.)
$md_{15}$=mean density (lbs. per cu. ft.)
$W$=rate of flow (lbs. per unit $T$)

The position of the arm 81 is used to angularly position a transmitter 45, in turn positioning a receiver 57 and cam 83. Closely related is a cam 84 positioned by a receiver 58 under the control of a transmitter 47 responsive to mean temperature of the fluid mixture. Temperature responsive bulb 86 is located in the fluid at the outlet of the heating section 15, while bulb 87 is located at the inlet to the section. The corresponding Bourdon tubes 88, 89 are arranged to position the transmitter 47 according to the mean temperature of the fluid through the section 15. The cams 83, 84 may be designed as uniform rise cams or to take care of any characteristics or relationship as may be desired. Through their interrelation an indicator 85 is continuously positioned relative to an index and recording chart 86 to advise the time-temperature relationship for the conversion section 15.

An indicator pen 90 is positioned with the indicator 85 by time-temperature relation but is further provided with a stock factor adjustment 91 so that the pen 90 records on the chart 86 the yield per pass. The stock factor adjustment 91 is available to correct for deviations in specific gravity, anilin number, and such other variables as may affect the charge or fluid entering the conduit 1.

The orifice 12A may be within the heater having a fluid flow path. In Fig. 5 the orifice 12A is shown away from the coils 14, 15 and heat source 2 only as a matter of clarity in the drawings.

Figure 6:
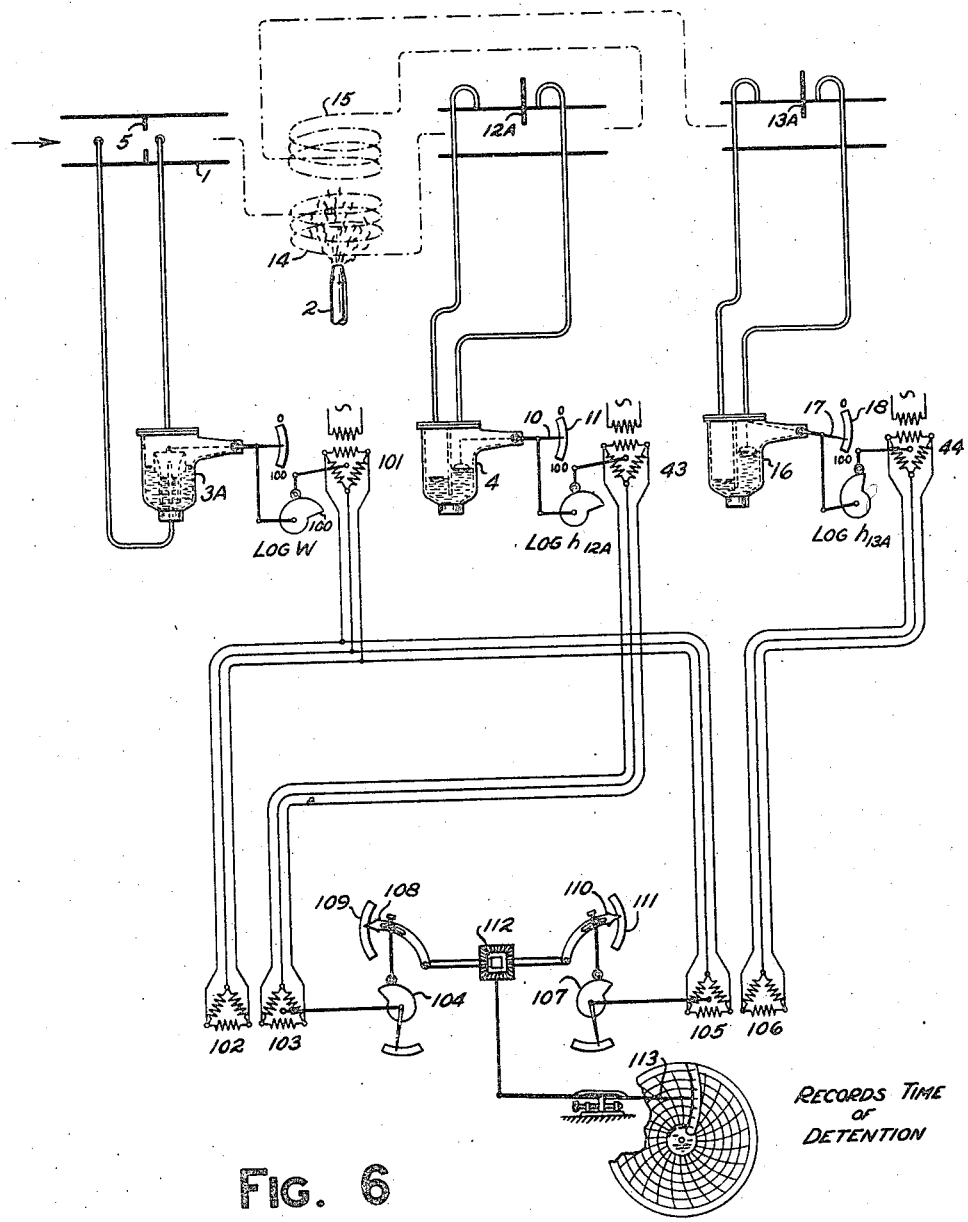
Fig. 6 is a diagrammatic illustration of a further embodiment of my invention.

In Fig. 6 I illustrate a further arrangement to indicate or record time of detention or treatment. A rate-of-flow meter 3A is of a type having a shaped liquid sealed bell adapted to correct for the quadratic relation between differential head and rate of flow and positions a cam 100 directly in accordance with $W$ or pounds per unit of time. The transmitter 101 moves proportional to log $W$.

The differential receiver 102—103 is sensitive to log $W$ and log $h_{12A}$ positioning the antilog cam 104 according to $$\log W - \log h_{12A} = \log \frac{W}{h_{12A}}$$

Likewise the receiver 105—106 is sensitive to log $W$ and log $h_{13A}$ positioning the antilog cam 107 according to $$\log W - \log h_{13A} = \log \frac{W}{h_{13A}}$$

The pointer 108 then indicates relative to the index 109 the value of $$\frac{W}{h_{12A}}$$

and pointer 110 relative to index 111 the value of $$\frac{W}{h_{13A}}$$

The two are algebraically added through the mechanical differential 112 and the pen 113 indicates and records time of detention or treatment, from:

$$W = 360cfD^2\sqrt{h_5 d_5}$$
$$= K_5\sqrt{h_5 d_5}$$
$$d_{12A} = d_5 \frac{K_5^2}{K_{12A}^2} \times \frac{h_5}{h_{12A}}$$
$$W_{13A} = W_5 = K_{13A}\sqrt{h_{13A} d_{13A}}$$
$$d_{13A} = d_5 \frac{K_5^2}{K_{13A}^2} \times \frac{h_5}{h_{13A}}$$

and $$md_{15} = \frac{d_{12A} + d_{13A}}{2} = \frac{d_5}{2}\left[\frac{K_5^2 h_5}{K_{12A}^2 h_{12A}} + \frac{K_5^2 h_5}{K_{13A}^2 h_{13A}}\right]$$
$$T = \frac{V md_{15}}{W}$$
$$V = \text{Volume (a constant)}$$
$$W = K_5\sqrt{h_5 d_5}$$
$$T = \frac{V}{2}\left[\frac{W}{K_{12A}^2 h_{12A}} + \frac{W}{K_{13A}^2 h_{13A}}\right]$$

While I have chosen to illustrate and describe the functioning of my invention in connection with the heating of petroleum or hydrocarbon oil, it is to be understood that the apparatus is equally applicable to the treatment, processing, or working of other fluids, such for example, as in the vaporization of water to form steam.

This application constitutes a continuation in part of my original application Serial No. 152,855 filed in the United States Patent Office July 9, 1937.

What I claim as new, and desire to secure by Letters Patent of the United States, is:

1. In combination with a fluid heater having a once through fluid path and a plurality of heating sections connected in series, means for exhibiting the relationship between the temperature at a point in the fluid path and the time length of passage of the fluid through a section, comprising in combination, means for determining the mean density of the fluid in the section, means for determining the rate of flow of fluid at the inlet to such sections, logarithmic means for determining the ratio between the rate of flow of fluid and the density of the fluid, means sensitive to the temperature at a point in the path of said fluid flow, and indicating means sensitive to the relationship between the last two named means.

2. In combination with a fluid heater having a once through fluid path and a plurality of heating sections connected in series, means for exhibiting the relationship between the temperature at a point in the fluid path and the time length of passage of the fluid through a section, comprising in combination, differential pressure producing devices located in the fluid path at the entrance to said heater and at the inlet to said section and at the outlet from said section, means positioned in accordance with the logarithm of the magnitude of each of the produced differential pressures, a transmitting generator positioned by each of said last named means, a first differential receiving motor electrically connected to the entrance and inlet transmitters, a first movable member positioned in accordance with the antilogarithm of the angular position of the first differential receiving motor, a second differential receiving motor electrically connected to the entrance and outlet transmitters, a second movable member positioned in accordance with the antilogarithm of the angular position of the second differential receiving motor, an arm positioned in accordance with the relationship between the positions of the first and second movable members, a transmitting generator positioned in accordance with the logarithm of the position of said arm, a third differential receiving motor electrically connected to said last named generator and said entrance transmitter, a third movable member positioned in accordance with the antilogarithm of the angular position of the third differential receiving motor, means for determining the temperature of the fluid at a point in the fluid path, a member positioned by said last named means, and an indicator actuated by said last named member and said third named member.

3. Apparatus for automatically controlling the treatment of a flowing selected fluid, comprising in combination, logarithmic means for determining the density of the fluid in the flow path prior to treatment, logarithmic means for determining the density of the fluid in the flow path after treatment, and control means for the treatment conjointly responsive to said logarithmic means.

4. Apparatus for controlling the operation of a fluid heater through which a selected fluid is continuously passed under pressure, comprising in combination, heat supply means for the heater, means continuously logarithmically determining the density of the flowing fluid as it is being heated, and control means for the heating positioned by said second means.

5. Apparatus for controlling the operation of a fluid treating system through which a selected fluid is continuously passed under pressure, comprising in combination, means for treating the fluid, means continuously logarithmically determining the density of the flowing fluid prior to treatment, means continuously logarithmically determining the density of the flowing fluid after treatment, and control means for the treating means positioned conjointly by both said determining means.

6. Apparatus for controlling the operation of a fluid heater through which a selected fluid is continuously passed under pressure, comprising in combination, means for regulating the weight rate of fluid flow through the heater, means continuously logarithmically determining the density of the flowing fluid at the entrance to the heater, means continuously logarithmically determining the density of the flowing fluid at the exit of the heater, and control means for said regulating means positioned conjointly by both said determining means.

7. Apparatus for controlling the operation of a fluid heater through which a selected fluid is continuously passed under pressure, comprising in combination, heat supply means for the heater, means continuously logarithmically determining the mean density of the flowing fluid as it is being heated, and control means for the heating positioned by said second means.

8. Apparatus for controlling the operation of a fluid heater through which a selected fluid is continuously passed under pressure, comprising in combination, heat supply means for the heater, means continuously logarithmically determining the density of the flowing fluid as it is being heated, and control means for the weight rate of flow of the fluid positioned by said second means.

9. Apparatus for controlling the operation of a fluid heater through which a selected fluid is continuously passed under pressure, comprising in combination, heat supply means for the heater, means continuously logarithmically determining the density of the flowing fluid as it is being heated, and control means for both the heating and the weight rate of flow of the fluid positioned by said second means.

10. Apparatus for controlling the operation of a fluid treating system through which a selected fluid is continuously passed under pressure, comprising in combination, treating means for the fluid, means continuously logarithmically determining the time of treatment of the fluid, and control means for the treating means positioned by said second means.

11. Apparatus for controlling the operation of a fluid treating system through which a selected fluid is continuously passed under pressure, comprising in combination, treating means for the fluid, means continuously logarithmically determining the time-temperature treatment of the fluid, and control means for the treating means positioned by said second means.

JOHN F. LUHRS.